No. 767,164. PATENTED AUG. 9, 1904.
G. W. NICKERSON.
SELF LUBRICATING CARRIAGE BEARING.
APPLICATION FILED MAY 16, 1904.
NO MODEL.

Witnesses:
H. B. Davis.
Maud M. Piper.

Inventor:
George W. Nickerson
by Noyes & Hemnier
Attys.

No. 767,164.

Patented August 9, 1904.

UNITED STATES PATENT OFFICE.

GEORGE W. NICKERSON, OF WELLFLEET, MASSACHUSETTS.

SELF-LUBRICATING CARRIAGE-BEARING.

SPECIFICATION forming part of Letters Patent No. 767,164, dated August 9, 1904.

Application filed May 16, 1904. Serial No. 208,073. (No model.)

*To all whom it may concern:*

Be it known that I, GEORGE W. NICKERSON, of Wellfleet, county of Barnstable, State of Massachusetts, have invented an Improvement in Self-Lubricating Carriage-Bearings, of which the following description, in connection with the accompanying drawings, is a specification, like characters on the drawings representing like parts.

My invention relates to a form of self-lubricating bearing which is especially applicable to the wheels of carriages, and has for its object to provide a self-lubricating attachment which can be conveniently applied to the wooden hub of an ordinary carriage-wheel, said attachment being adapted to be supplied with oil conveniently while the wheel is on the axle and to contain enough oil, which it supplies gradually to the bearing, to keep the bearing thoroughly lubricated for a long time. I accomplish these objects by providing the hub with an elongated recess leading from the axle-chamber through the usual axle-box into the hub and by providing a correspondingly-shaped oil-containing cup which is adapted to be inserted in said recess and to supply oil to the wheel-axle as needed, said oil-cup being provided with a supply-tube which leads therefrom to the surface of the hub.

Figure 1:
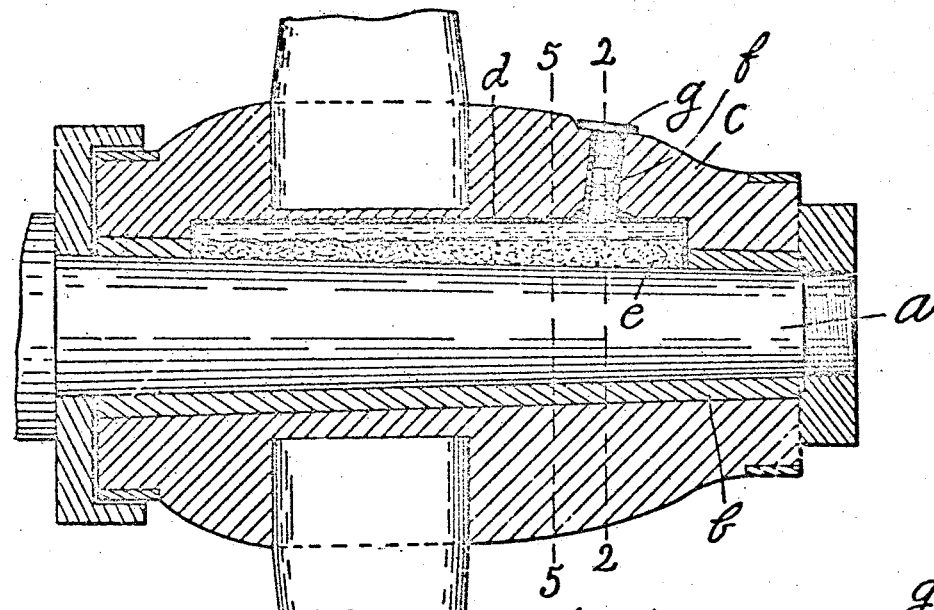
Figure 3:
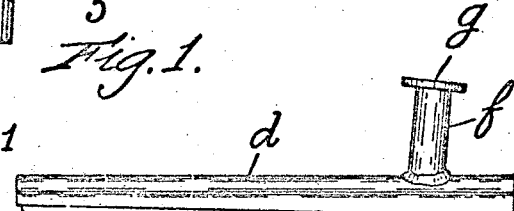
Figure 2:
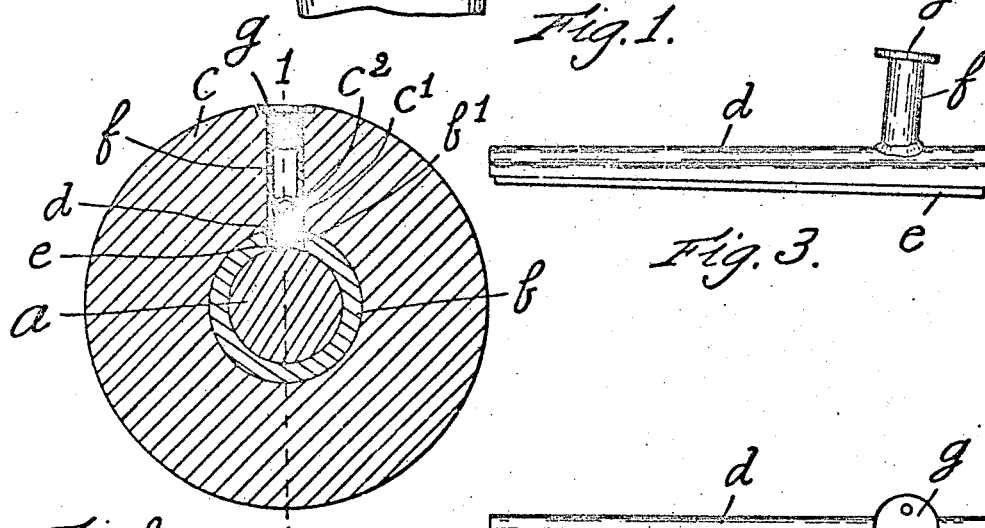
Figure 4:
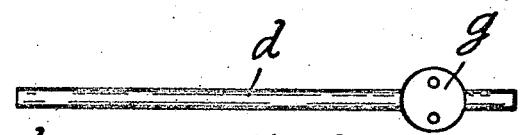
Figure 5:
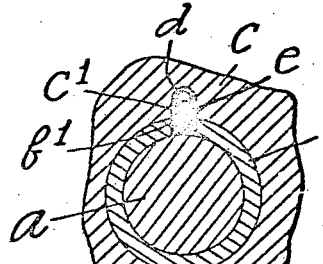

In the drawings, Figure 1 is a longitudinal sectional view on the line 1 1 of Fig. 2. Fig. 2 is a cross-sectional view on the line 2 2 of Fig. 1. Fig. 3 is a side elevation, and Fig. 4 a plan detail view, of the oil-chamber. Fig. 5 is a cross-sectional view on the line 5 5 of Fig. 1.

As shown in the drawings, the usual carriage-axle $a$ is provided with an axle-box $b$, rotatably mounted thereon and secured in the usual wooden hub $c$. The axle-box is provided with a relatively narrow longitudinally-extending slot $b'$ of suitable length, said slot preferably extending through approximately one-half of the length of the box and terminating at a suitable distance from each end. Said hub is also provided with a correspondingly-shaped recess $c'$, which registers with the slot $b'$ and is of the same width and length. A hole $c^2$ is bored through the hub to the bottom of the recess $c'$. I also provide a rectangular-shaped cup $d$, which is formed from a sheet-metal strip bent double to provide two sides, its end edges being soldered or otherwise connected together, thereby providing a cup which is closed at all points except at one longitudinal edge, its opening forming a narrow slot which is filled with a felt packing $e$, said packing extending a short distance beyond the inner edges of the side walls of the cup. The size of said cup is such that it fits easily into recess $c'$ through slot $b'$, so that the edge of said packing may bear against the axle $a$. An oil-supplying tube $f$ is arranged in the hole $c^2$ in the hub and is tightly connected or soldered to the bottom or closed edge of the cup $d$. The outer end of said tube is screw-threaded and adapted to be closed tightly with a screw-plug $g$ of suitable form, the head of which bears against the hub, its surface being preferably flush with the surface of the hub and being provided with any suitable recesses to enable it to be removed readily with a spanner or other device.

In placing the oil-cup in position in the hub, the slot in the axle-box and recess in the hub having been formed, the cup is passed through the axle-chamber and pressed into the recess, the oil-tube $f$ being passed into the hole $c^2$. The outer end of the tube $f$ is then closed, and the cup is held in place by the cap $g$ until the axle $a$ is inserted in the box or while the wheel is removed from the axle.

The cup is filled with oil by simply pouring it into the tube $f$, the oil soaking through the felt packing to the axle and supplying it in such quantity as may be required for the proper lubrication of the bearing, the cup containing sufficient oil to lubricate the bearing for a long time. With this arrangement, moreover, the oil is never supplied to the axle in sufficient quantities to cause the same to work out at the ends of the hub to an appreciable extent.

Having thus described my invention, what I claim as new, and desire to secure by Letters Patent, is—

1. In combination with a carriage-wheel hub having a longitudinally-extending, slot-shaped recess therein leading from the axle-chamber and terminating short of each end thereof, a correspondingly-shaped oil-cup located in said recess and removable therefrom through the axle-chamber, said cup having a pair of longitudinal side walls connected at their ends and at one longitudinal edge and having a narrow, elongated opening at its opposite edge connecting the interior of the cup with the axle-chamber, and an absorbent packing closing said edge opening and arranged to bear against the surface of the wheel-axle, substantially as described.

2. In combination with a carriage-wheel hub having a longitudinally-extending, slot-shaped recess therein leading from the axle-chamber and terminating short of each end thereof, a correspondingly-shaped oil-cup removably fitted in said recess, said cup having a pair of longitudinal side walls connected at their ends, and at one longitudinal edge and having a narrow, elongated opening at its opposite edge connecting the interior of the cup with the axle-chamber, an absorbent packing closing said edge opening and arranged to bear against the surface of the wheel-axle, an oil-tube connected to said oil-cup at its closed longitudinal edge, and leading to the surface of the hub, and means for closing the outer end of said tube, substantially as described.

3. In a carriage-wheel, the hub having an axle-box, said hub having a longitudinally-extending relatively narrow recess therein, and said axle-box having a longitudinal slot registering with said recess and terminating short of the ends of said box, a cup insertible in said recess through the axle-chamber and said slot of the axle-box, said cup opening into said chamber and having an absorbent packing arranged to close its opening and to bear against the axle, an oil-tube connected to said cup and passing through the hub, and a cap closing said tube and bearing against the hub to support the cup in said recess, substantially as described.

In testimony whereof I have signed my name to this specification in the presence of two subscribing witnesses.

GEORGE W. NICKERSON.

Witnesses:
L. H. HARRIMAN,
THOMAS KEMP.